(12) United States Patent
Zhang

(10) Patent No.: US 9,430,274 B2
(45) Date of Patent: Aug. 30, 2016

(54) EFFICIENT METHODS AND SYSTEMS FOR CONSISTENT READ IN RECORD-BASED MULTI-VERSION CONCURRENCY CONTROL

(71) Applicant: FutureWei Technologies, Inc., Plano, TX (US)

(72) Inventor: Guogen Zhang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 341 days.

(21) Appl. No.: 14/229,519

(22) Filed: Mar. 28, 2014

(65) Prior Publication Data

US 2015/0278281 A1  Oct. 1, 2015

(51) Int. Cl.
*G06F 7/00* (2006.01)
*G06F 9/46* (2006.01)
*G06F 17/30* (2006.01)

(52) U.S. Cl.
CPC ......... *G06F 9/466* (2013.01); *G06F 17/30088* (2013.01); *G06F 17/30336* (2013.01); *G06F 17/30339* (2013.01); *G06F 17/30353* (2013.01)

(58) Field of Classification Search
CPC ................................................. G06F 17/30088
See application file for complete search history.

(56) References Cited

U.S. PATENT DOCUMENTS

| | | |
|---|---|---|
| 2004/0249838 A1 | 12/2004 | Hinshaw et al. |
| 2005/0171960 A1 | 8/2005 | Lomet |
| 2012/0084274 A1 | 4/2012 | Renkes et al. |
| 2012/0109903 A1 | 5/2012 | Freedman et al. |
| 2012/0233139 A1 | 9/2012 | Larson et al. |
| 2013/0262423 A1 | 10/2013 | Graefe et al. |

FOREIGN PATENT DOCUMENTS

| | | |
|---|---|---|
| CN | 102103642 A | 6/2011 |
| CN | 102567453 A | 7/2012 |
| CN | 102682071 A | 9/2012 |
| CN | 102750376 A | 10/2012 |

OTHER PUBLICATIONS

International Search Report and Written Opinion of the International Searching Authority received in Patent Cooperation Treaty Application No. PCT/US2015/074299 mailed Jun. 29, 2015, 13 pages.

(Continued)

*Primary Examiner* — Ajith Jacob
(74) *Attorney, Agent, or Firm* — Slater Matsil, LLP

(57) ABSTRACT

System and method embodiments are provided for consistent read in a record-based multi-version concurrency control (MVCC) in database (DB) management systems. In an embodiment, a method in a record-based multi-version concurrent control (MVCC) database (DB) management system for a snapshot consistent read includes copying a system commit transaction identifier (TxID) and a current log record sequence number (LSN) from a transaction log at a start of a reader without backfilling of a commit LSN of a transaction to records that are changed and without copying an entire transaction table by the reader; and determining whether a record is visible according to a record TxID, the commit TxID and a current LSN, wherein a transaction table is consulted only when the record TxID is equal to or larger than a commit TxID at a transaction start.

21 Claims, 4 Drawing Sheets

(56) References Cited

OTHER PUBLICATIONS

Becker, B., "An Asymptotically Optimal Multiversion B-Tree," The VLDB Journal 5, 1996, pp. 264-275.

Bober, P. et al., "Indexing for Multiversion Locking: Alternatives and Performance Evaluation," IEEE Transactioins on Knowledge and Data Engineering, vol. 9, No. 1, Jan.-Feb. 1997, pp. 68-84.

Comer, D., "The Ubiquitous B-Tree," ACM Computing Surveys, vol. 11, No. 2, Jun. 1979, pp. 121-137.

Graefe, G., "Modern B-Tree Techniques,"Foundations and Trends in Databases, vol. 3, No. 4, 2010, pp. 203-402, DOI: 10.1561/1900000028.

Mohan, C., "ARIES/IM: An Efficient and High Concurrency Index Management Method Using Write-Ahead Logging, Special Interest Group on Management of Data," Special Interest Group on Management of Data, 1992, pp. 371-380.

Mohan, C., "Commit-LSN: a Novel and Simple Method for Reducing Locking and Latching in Transaction Processing Systems," Data Base Technology Institute, IBM Almaden Research Center, Proceedings of the 16th VLDB Conference, Brisbane, Australia, Aug. 1990, pp. 406-418.

Mohan, C. et al., "ARIES: A Transaction Recovery Method Supporting Fine-Granularity Locking and Partial Rollbacks Using Write-Ahead Logging," ACM Transactions on Database Systems, vol. 17, No. 1, Mar. 1992, pp. 94-162.

International Search Report and Written Opinion of the International Searching Authority received in Patent Cooperation Treaty Application No. PCT/CN2015/074928 mailed Jun. 15, 2015, 13 pages.

EFFICIENT METHODS AND SYSTEMS FOR CONSISTENT READ IN RECORD-BASED MULTI-VERSION CONCURRENCY CONTROL

CROSS-REFERENCE TO RELATED APPLICATIONS

The present application is related to U.S. patent application Ser. No. 14/229,638 filed even date herewith and entitled "Systems and Methods to Optimize Multi-version Support in Indexes," which is incorporated herein by reference as if reproduced in its entirety.

TECHNICAL FIELD

The present invention relates to a system and method for record-based multi-version concurrency control in database management systems, and, in particular embodiments, to a system and method for a consistent read in record-based multi-version concurrency control in database management systems.

BACKGROUND

In modern database management systems, Multi-version Concurrency Control (MVCC) is a fundamental mechanism to achieve high concurrency allowing readers without blocking updaters and updaters without blocking readers, and snapshot read consistency, which is critical for many applications. MVCC can be categorized into page-based and record-based approaches, typically combined with UNDO and logging mechanisms. A record-based method can use a linked chain of historical (delta) records for the history of a record. To read a record at a certain time, the system traverses the chain to find the last record that is committed at the time.

SUMMARY

In accordance with an embodiment, a method in a record-based multi-version concurrent control (MVCC) database (DB) management system for a snapshot consistent read includes copying a system commit transaction identifier (TxID) and a current log record sequence number (LSN) from a transaction log at a start of a reader without backfilling of a commit LSN of a transaction to records that are changed and without copying an entire transaction table by the reader; and determining whether a record is visible according to a record TxID, the commit TxID and a current LSN, wherein a transaction table is consulted only when the record TxID is equal to or larger than a commit TxID at a transaction start.

In accordance with an embodiment, a data processing system configured for managing a database includes a processor and a computer readable storage medium storing programming for execution by the processor, the programming including instructions to: copy a system commit transaction identifier (TxID) and a current log record sequence number (LSN) from a transaction log at a start of a reader without backfilling of a commit LSN of a transaction to records that are changed and without copying an entire transaction table by the reader; and determine whether a record is visible according to a record TxID, the commit TxID and a current LSN, wherein a transaction table is consulted only when the record TxID is equal to or larger than a commit TxID at a transaction start.

In accordance with an embodiment, a system for record-based multi-version concurrent control (MVCC) database (DB) management includes a transaction table comprising a status of each of a plurality of transactions in the system, wherein each transaction is indexed with a transaction identifier (TxID), wherein the TxIDs monotonically increase with time, and wherein a commit TxID is an oldest ID of active transactions in the transaction table; a storage subsystem configured to store a plurality of versions of records and an update history for each record, wherein each record comprises a TxID of a transaction that created or deleted the record; a logging subsystem comprising a processor, wherein the logging subsystem is configured to track all changes to the storage subsystem and configured to use a log record sequence number (LSN) for sequence comparison and recovery; and a reader configured to copy only a system commit TxID and a current LSN and determine whether a record is visible according to a record TxID, commit TxID, and the current LSN at a transaction start without consulting the transaction table unless the record TxID is equal to or larger than the commit TxID at the transaction start.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
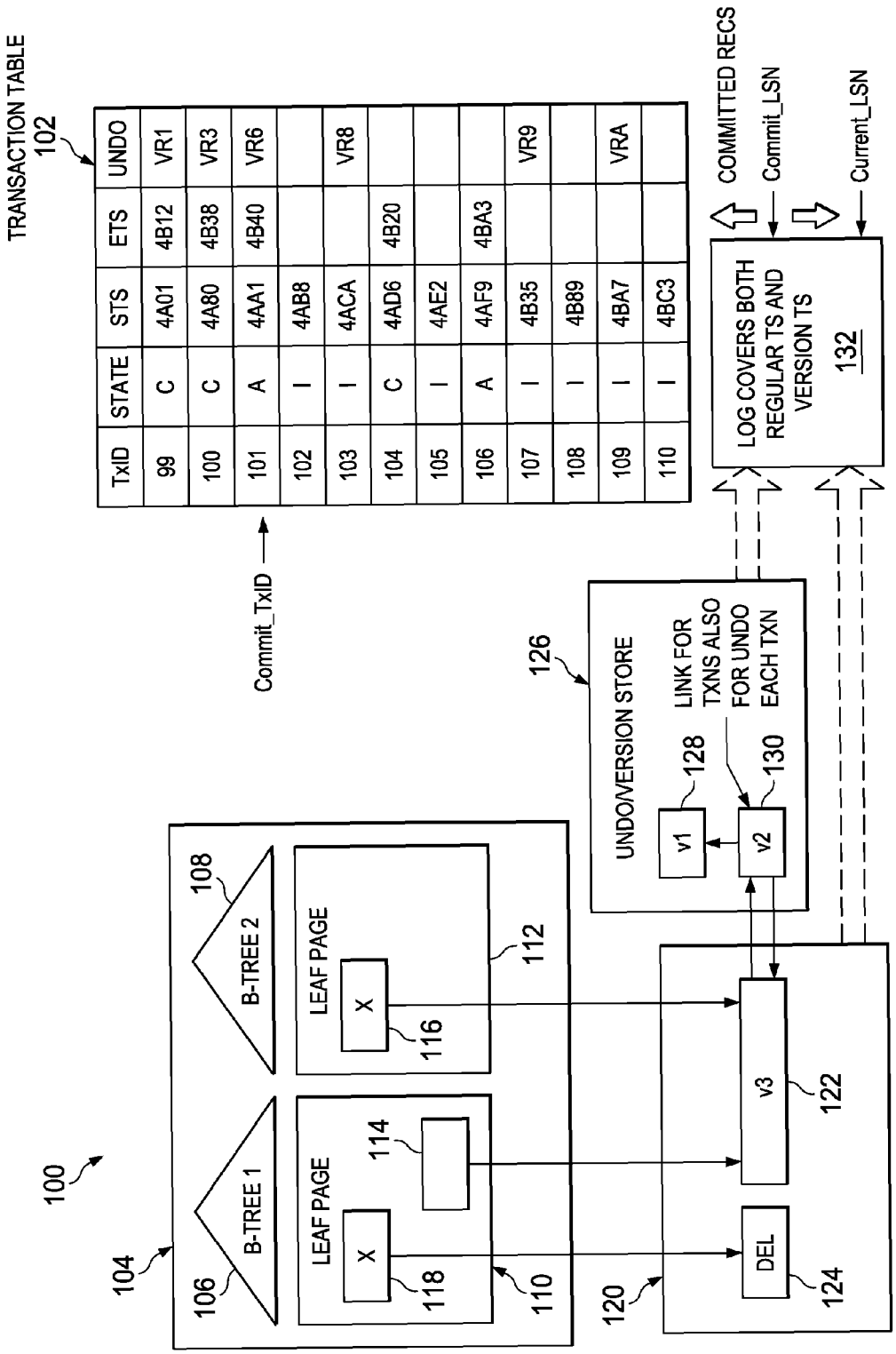
FIG. 1 is a block diagram illustrating an embodiment architecture for record-based MVCC.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Compared to the page-based MVCC mechanism, which rolls back whole pages to find the right records, the record-based methods are simpler and could be more efficient. One focus of this disclosure is on the record-based MVCC approach, especially the mechanism to achieve efficient read consistency, the snapshot read consistency.

The snapshot read consistency is for a reader (transaction or query) to read last records committed at the start time of the reader. Each record is marked logically with its transaction information. When a transaction updates a record, it does not know its own commit timestamp, usually represented using commit log sequence number, or transaction commit LSN. Therefore a transaction ID is recorded in a record written by the updating transaction. Only at the commit time, the transaction commit LSN is known. Transaction commit LSN is used to test whether a record is visible to a reader or not. The situation that the transaction commit LSN was not known at record creation or update time and consistent read requires the commit LSN creates a challenging problem, and optimization is critical for efficient methods.

Another approach is to keep a transaction table that records a mapping from transaction IDs to their terminating time, i.e. either commit LSN or abort LSN. However, in order to speed up consistent reads while not causing prolonged commit, the transaction ID in records changed by a transaction is replaced by its commit LSN in the background after a transaction is committed. One bit can be used to differentiate between TxID and the transaction Commit LSN (Tx_CLSN) in the record header. The backfill of commit LSNs is still an expensive operation.

Disclosed herein are methods and systems for snapshot read that does not require the replacement of transaction IDs in records while achieving efficient consistent read by using system-wide Commit_TxID (Commit_TransactionID) as the optimization. Commit_TxID is similar to the Commit_LSN proposed by C. Mohan to optimize the testing of record commitment/visibility. Transaction IDs are monotonically increasing. A transaction is called active if it is in flight, or aborted but not physically rolled back. A (system) Commit_TxID is defined as the oldest transaction ID whose transaction is still active in the system. Note that all records of aborted or rolled-back transactions with ID less than this transaction ID are all physically UNDONE. This means all the records having a transaction ID less than this Commit_TxID is committed. The system maintains the Commit_TxID continuously. When a reader (transaction or query) starts, the system keeps the current Commit_TxID value in myCommit_TxID, which is used to compare with the transaction ID in a record to determine whether the record is committed or not at the time the reader starts. The system also takes a note on the current LSN for the reader. In case the transaction ID is larger than or equal to the Commit_TxID, the transaction table is consulted to find the commit_LSN for the transaction ID and a decision can be made based on the LSN comparison. Since majority of the records in a database system are committed, only a very small percentage of records requires lookup in the transaction table. The lookup action is needed even with backfill replacement of commit_LSN to the records as some records will have transaction IDs. The avoidance of replacement of transaction IDs with commit_LSNs makes this method even simpler and more robust, and in most cases more efficient.

In an embodiment, as compared to similar UNDO-based approaches, the one aspect of this disclosure is no backfill of commit LSN of a transaction to records that it changes. Although it can be achieved by following the rollback/undo chain for the transaction, backfill of commit LSN interferes with the normal transaction processing, and especially impacts input/output (I/O) and central processing unit (CPU)/cache behavior. The backfill approach requires checking of the Transaction table for transaction IDs it encounters, while embodiments of the disclosed approach limit the checking of the Transaction table for transaction IDs that is equal to or larger than myCommit_LSN. The transaction IDs that are equal to or larger than myCommit_LSN should be small. Furthermore, avoiding backfilling is a relatively large benefit.

Also, in an embodiment, as compared to the approach used in PostgreSQL, which does not use UNDO, one disclosed aspect that is different from PostgreSQL is that the checking of commitment for snapshot semantics is simpler. In PostgreSQL, PostgreSQL needs to make a copy of entire (logical) Transaction table at the beginning of a reader (all active transaction IDs), and the Transaction table becomes a hot spot. Also PostgreSQL needs more space than embodiments of this disclosure. Furthermore, in PostgreSQL, for transactions in the history, since records by aborted transactions are not physically rolled back, all transaction history needs to be kept with a bit map, until a batch cleanup on data is done (Vacuum), which usually causes a performance hit to the system.

In an embodiment, a record-based MVCC is disclosed that is simpler and lighter weight than page-based MVCC. In an embodiment, transaction commit LSN is used to check visibility of records.

FIG. 1 is a block diagram illustrating an embodiment architecture 100 for record-based MVCC. In an embodiment, the architecture 100 includes data page MVCC and index MVCC, although the method for index MVCC is largely independent of data page MVCC. One focus of this disclosure is data page MVCC.

The architecture 100 includes data pages 120 (or base data records in a table space), a transaction table 102, a log 132, an UNDO/version store 126, and B-tree index subsystem 104. The transaction table 102 keeps track of transaction information. The transaction table 102 includes entries for TxID, state, start time stamp (STS), end time stamp (ETS), and Undo record chain for various records. The state can be committed (C), aborted (A), and inflight (I). The undo entry in the transaction table 102 indicates a version store record ID as the starting undo point of the undo record chain for the current transaction.

The log 132 includes changes to both regular tablespace (TS) (e.g., data page 120) and the version TS (e.g., UNDO/version store 126) for recovery purposes. The log 132 also includes committed records, the commit LSNs and a current LSN for a record. The UNDO/version store 126 stores old versions of records. There are links between the base data records in the data page 120 and the history records in the UNDO/version store 126. The UNDO/version store 126 includes links 128, 130 for the record versions and also for UNDO chain of each transaction (not shown). Thus, the link for version 2 (v2) points to the link for version 1 (v1) as the version for the record.

The data page 120 includes a current version record 122 and a deleted record 124. In an embodiment, B-tree index subsystem 104 include B-tree 1 106 and B-tree 2 108. Each B-tree 106, 108 includes a corresponding leaf page 110, 112. Each leaf page 110, 112 includes a pointer 114, 116 to a current version record 3 122 in the data page 120 or to a deleted version record 124 in the data page 120.

In an embodiment, a record in B-tree leaf pages (or other index structures) will keep transaction information for its creation and deletion so that consistent read can be achieved without looking at data records. Old versions do not have to be moved into separate storage spaces. Older records can be purged (if deleted) or compacted to improve space and time efficiency. In an embodiment, these can be optimized by using Commit_TxID or Commit_LSN.

In an embodiment, multi-version support for B-tree indexes is achieved by extending the leaf page records with information about the transactions that create or delete the records. The system keeps track of all transaction status in a Transaction table, and logs the changes in a log. Log (record) sequence number (LSN) is used to identify the status of pages and records. When a transaction starts, the transaction is assigned a transaction ID and a start timestamp (LSN). All the changes made by the transaction can be temporarily marked with the transaction ID (or TxID). When the transaction commits, that transaction has a commit LSN. Consistent read is based on the commit LSN to achieve a snapshot consistency, i.e., a reader will only read records that were committed at the time when the reader starts. In other words, a record is visible to a reader if the record is not deleted and its transaction's commit LSN is smaller than the reader's LSN.

There are two approaches in comparing LSNs. One is to replace the TxID with LSN in records when the transaction commits or after it commits. The other is to look up TxID in the Transaction table to find the transaction status and its commit LSN for comparison. Both methods can be optimized by employing system-wide Commit_LSN or Commit_TxID. Commit_LSN is defined as the largest LSN such that all log records before this LSN have been committed. Likewise, Commit_TxID is the largest transaction ID such that all transactions before this TxID have been committed, and all records by rolled back transactions before this TxID are physically undone. So, in an embodiment, the main techniques in supporting and optimizing index MVCC are:
  1. Augment the leaf page records with transaction information. No need to have separate version storage for the index records.
  2. Creation Transaction ID (creation TxID or CTxID) or Commit LSN can be removed from records and replaced with 1 bit to indicate the record is old and it's older than system-wide Commit_TxID or Commit_LSN (which is older than the oldest reader LSN.)
  3. Deleted records can be purged if its deletion LSN or TxID is older than system-wide Commit_TxID or Commit_LSN.

Actions 2 and 3 are called compaction and can be performed before page split during search for spaces. After compaction, the version information becomes 1 bit, and since the majority of records will be compacted, this makes the index multi-version support lower in cost in terms of space requirement as compared to other methods. During a search operation, checking a record visibility can be substantially optimized by comparing Commit_TxID or Commit_LSN for a transaction ID or commit LSN in a record, and only consulting the Transaction table 102 for the newer records, which are usually a very small percentage of the overall records. Similar compaction techniques can be applied to data records on data pages.

Figure 2:
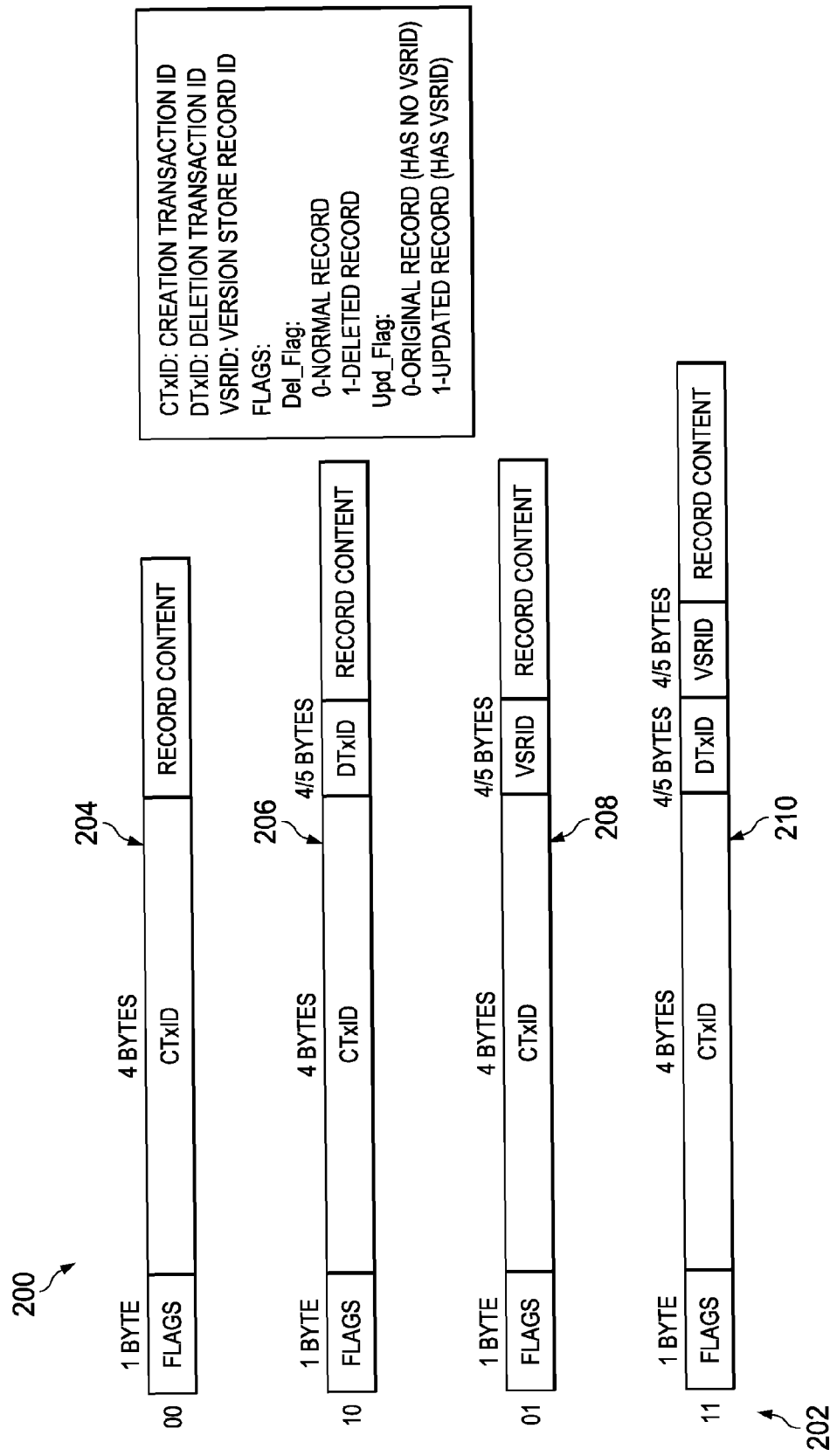
FIG. 2 is a block diagram illustrating an embodiment record format in the table space.

FIG. 2 is a block diagram illustrating an embodiment record format 200 in the table space. The record format 200 includes four types of records 204, 206, 208, 210. Each record 204, 206, 208, 210 includes a record header and a record content. The record header starts with a flag that indicates the record format details. In an embodiment, the flags include a deletion flag, that indicates whether the record 204, 206, 208, 210 is a normal record or a deleted record, and include an update flag, that indicates whether the record 204, 206, 208, 210 is an original record or an updated record. The particular flag values 202 for each type of record 204, 206, 208, 210 are indicated to the left of each record 204, 206, 208, 210. In an embodiment, the record header for record 204 includes a flag and a creation transaction ID (CTxID), where the flags are 00 indicating a normal original record (i.e., a record with no version store record ID (VSRID)). Record 206 is a deleted original record. The record header for record 206 includes flags, a CTxID, and a deletion transaction ID (DTxID). The flags for record 206 are 10 indicating that record 206 is a deleted record and an original record (i.e., has no VSRID). Record 208 is a normal (i.e., not deleted) updated record. The record header for record 208 includes flags, a CTxID, and a VSRID. The flags for record 208 are 01 indicating that record 208 is a normal (not deleted) record and that record 208 is an updated record.

An updated record includes a VSRID. The record header for record 210 includes flags, a CTxID, a DTxID, and a VSRID. The flags for record 210 are 11 indicating that record 210 is a deleted updated record. Because the record 210 is a deleted record, it includes a DTxID. Because the record 210 is an updated record, it contains a VSRID. In an embodiment, the flags are 1 byte each. In an embodiment, the CTxID is 4 bytes. In an embodiment the DTxID is 4 or 5 bytes. In an embodiment, the VSRID is 4 or 5 bytes. There are variations possible in the implementation of the records 204, 206, 208, 210 other than the embodiment illustrated in FIG. 2. In an embodiment, the VSRID is used as the link for history records. The history records can have similar formats or use delta to reduce the storage space consumption.

Returning to FIG. 1, the transaction table 203 maintenance is well known. The Commit_TxID maintenance can be achieved when a transaction commits or aborts. Initially, Commit_TxID is the minimum TxID of the transaction table. If a transaction next to the current Commit_TxID commits, Commit_TxID advances. This step repeats until the next transaction is either aborted or in flight.

If a transaction is aborted, there are two choices: immediate UNDO or deferred UNDO. Under the immediate UNDO, the system 100 will physically undo the changes made by the transaction before abortion completes. Under the deferred UNDO, the system 100 will have a background daemon to physically roll back the changes by the transaction. Once the rollback/undo is physically done, the Commit_TxID can advance to the next one. Once Commit_TxID advances, the entries before it can be purged.

In an embodiment, a circular array is used to implement the Transaction table 102.

The implementation of the log 132 and Commit_LSN is well known to those of ordinary skill in the art.

Any update protocol may be utilized for locking, etc. In an embodiment, it is only required that the records be chained based on the order from the most recent version to the oldest version. Any method for splitting records between the regular table space 120 and undo table space 126 may be utilized.

In an embodiment, the consistency is snapshot isolation (snapshot at the transaction start time). In another embodiment, the consistency is a committed read (snapshot at the query start time). Each embodiment of consistency can use the same logic, and the only difference is the values taken at the different point used in testing record commitment: at the transaction start time for snapshot isolation and at the query/statement start time for committed read. The term "at the transaction start" is used for illustration in the description.

At the beginning of the reader: record the current Commit_TxID and Current LSN, together with the TxID for the reader. These are referred to as myCommit_TxID, MyLSN, and myTxID respectively.

In an embodiment, the updated records 126 are chained from the latest (e.g., v2 130) to oldest (e.g., v1 128). When reading a record, the following logic applies. The flowchart shown in FIG. 3 and described below illustrates an embodiment of the detailed logic for reading a record. The following description gives highlighted explanation to some cases for reading a record according to an embodiment:
  If the record is not deleted and not updated (e.g., Flags=00)
    if CTxID<myCommit_TxID, then the record is committed, or if CTxID=myTxID,
  then the record was created by this transaction and thus is visible, and read its content.

Otherwise, CTxID>=myCommit_TxID, and look up the Transaction table for CTxID,
if it's committed and its ETS<myLSN, it's committed before the reader starts, read the content.
Otherwise, ignore the record.
If the record is not deleted, but updated (e.g., Flags=01),
Apply the same logic as above for CTxID . . . until last line
Instead of ignore the record, it has to chase the update chain to find one record that is committed or until
no committed record found.
If the record is deleted and not updated (e.g., Flags=10), apply the similar logic to see if the deleting transaction is committed or not. If it's committed, ignore the record, otherwise, apply the above logic, including chasing the chain to find a committed record or until no committed record is found.

Figure 3:
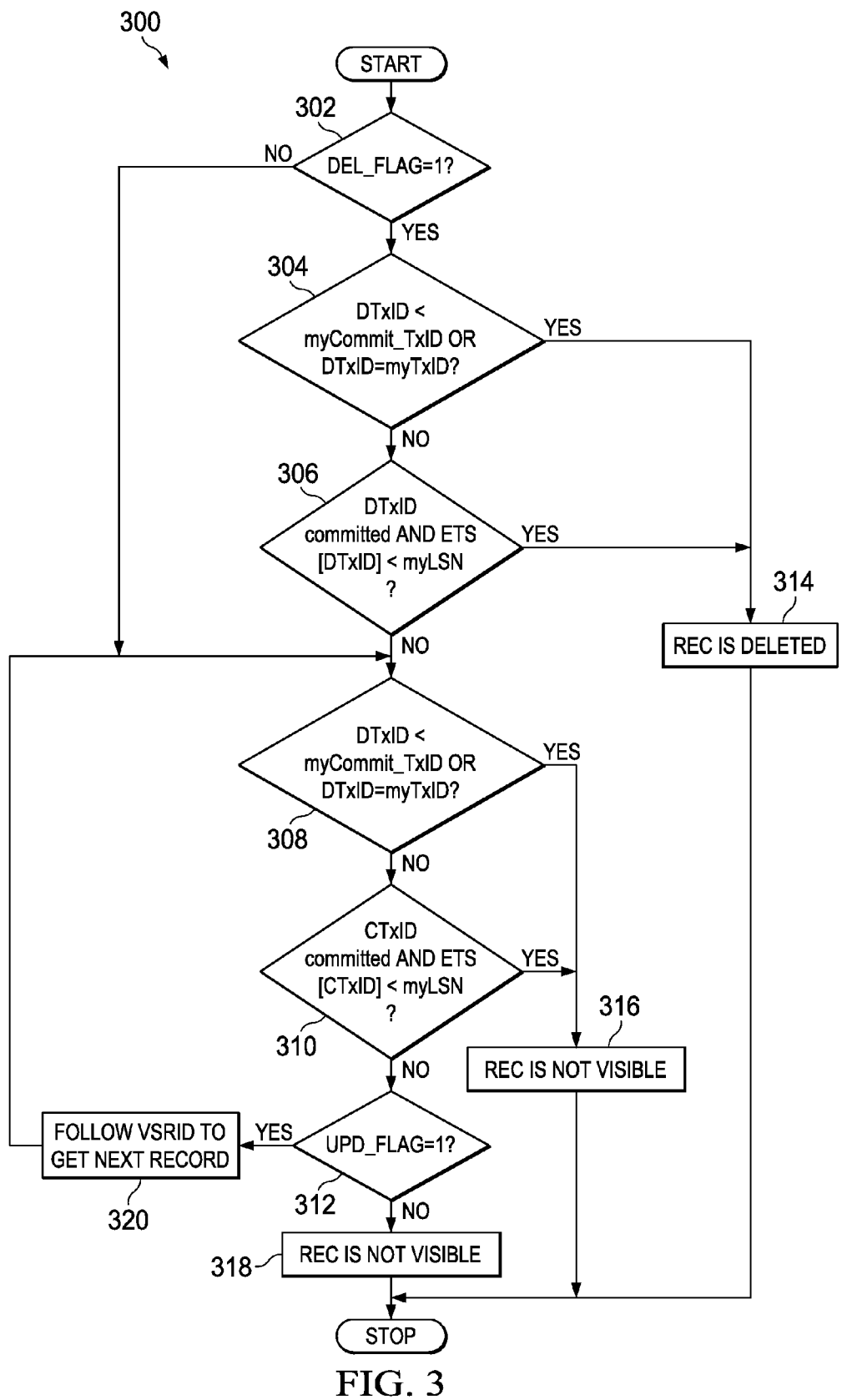
FIG. 3 is a flowcharts illustrating an embodiment method for reading a record in a MVCC database.

FIG. 3 is a flowchart illustrating an embodiment method 300 for reading a record in a MVCC database. The method 300 begins at block 302, where it is determined whether the deletion flag is equal to one. If the deletion flag is equal to one, then the method 300 proceeds to block 304 where it is determined whether the delete TxID is less than the system commit TxID at the transaction start, or the transaction is the one itself that made the deletion. If, at block 304, the delete TxID is less than the system commit TxID at the transaction start, or the transaction is the one that made the deletion itself, then the method 300 proceeds to block 314 where it is determined that the record is deleted, after which, the method 300 ends. If, at block 304, the delete TxID is not less than or equal to the system commit TxID at the transaction start, and the transaction is not the one that made the deletion, then the method 300 proceeds to block 306 where it is determined whether the transaction with the delete TxID is committed and the End Timestamp (ETS) of the delete TxID is less than a current log sequence number (LSN) at the transaction start (i.e., myLSN). If, at block 306, the delete TxID is committed and the End Timestamp (ETS) of the delete TxID is less than a myLSN, then the method 300 proceeds to block 314 where it is determined that the record is deleted, after which, the method 300 ends.

If, at block 302, the deletion flag is not equal to one or at block 306, the delete TxID is not committed and/or the End Timestamp (ETS) of the delete TxID is not less than a current log sequence number (LSN) at the transaction start, then the method 300 proceeds to block 308 where it is determined whether the record create TxID is less than a current commit TxID (myCommit_TxID) at the transaction start, or the transaction is the one itself that created the record. If, at block 308, the create TxID is less than the myCommit_TxID, or the transaction is the one itself that created the record, then the method 300 proceeds to block 316 where it is determined that the record is visible, after which, the method 300 ends. If, at block 308, the create TxID is not less than the myCommit_TxID and the transaction is not the one that created the record, then the method 300 proceeds to block 310 where it is determined whether the create TxID (CTxID) is committed, and the ETS(CTxID) is less than a current log sequence number (LSN) at the transaction start (i.e., myLSN). If, at block 310, the create TxID (CTxID) is committed, and the ETS(CTxID) is less than a current log sequence number (LSN) at the transaction start (i.e., myLSN), then the method 300 proceeds to block 316 where it is determined that the record is visible, after which, the method 300 ends. If, at block 310, it is determined that the create TxID (CTxID) is not committed or the ETS(CTxID) is not less than a current log sequence number (LSN) at the transaction start (i.e., myLSN), then the method 300 proceeds to block 312 where it is determined whether an update flag is equal to one. If, at block 312, the update flag is equal to one, then the method 300 proceeds to block 320 where the VSRID is followed to get the next record, after which, the method 300 proceeds back to block 308, to apply the logic to the history record. If, at block 312, it is determined that the update flag is not equal to one, the method 300 proceeds to block 318 where it is determined that the records is not visible, after which, the method 300 ends.

In an embodiment, to optimize for longer running readers, another value can be used: the last transaction ID (Last_TxID), and at the start of the reader, keep it in myLast_TxID. Any transaction ID that is larger than myLast_TxID is uncommitted at the transaction start.

In an embodiment, another optimization is the shortened transaction ID and compaction of record header. A transaction ID base (8 bytes in an embodiment) can be used for a page, and a relative transaction ID (4 bytes in an embodiment) is used in record headers to reduce the space usage. When the relative transaction ID overflows, a new base can be chosen such that older transaction IDs are all committed, and all these smaller relative TxIDs can be set to 0 to indicate they are all committed before the current base transaction ID on the page, or, in another embodiment, simply use a flag bit to indicate that fact and compact record headers by removing the transaction ID field. Compaction can be done on demand when more space is needed on the page.

The following references are related to subject matter of the present application. Each of these references is incorporated herein by reference in its entirety:

[1] C. Mohan et al. "ARIES: a transaction recovery method supporting fine-granularity locking and partial rollbacks using write-ahead logging." ACM Transactions on Database Systems (TODS), Volume 17 Issue 1, March 1992, Pages 94-162.

[2] C. Mohan, "Commit-LSN: a novel and simple method for reducing locking and latching in transaction processing systems." Proceedings of the sixteenth international conference on Very large databases, Pages 406-418.

Figure 4:
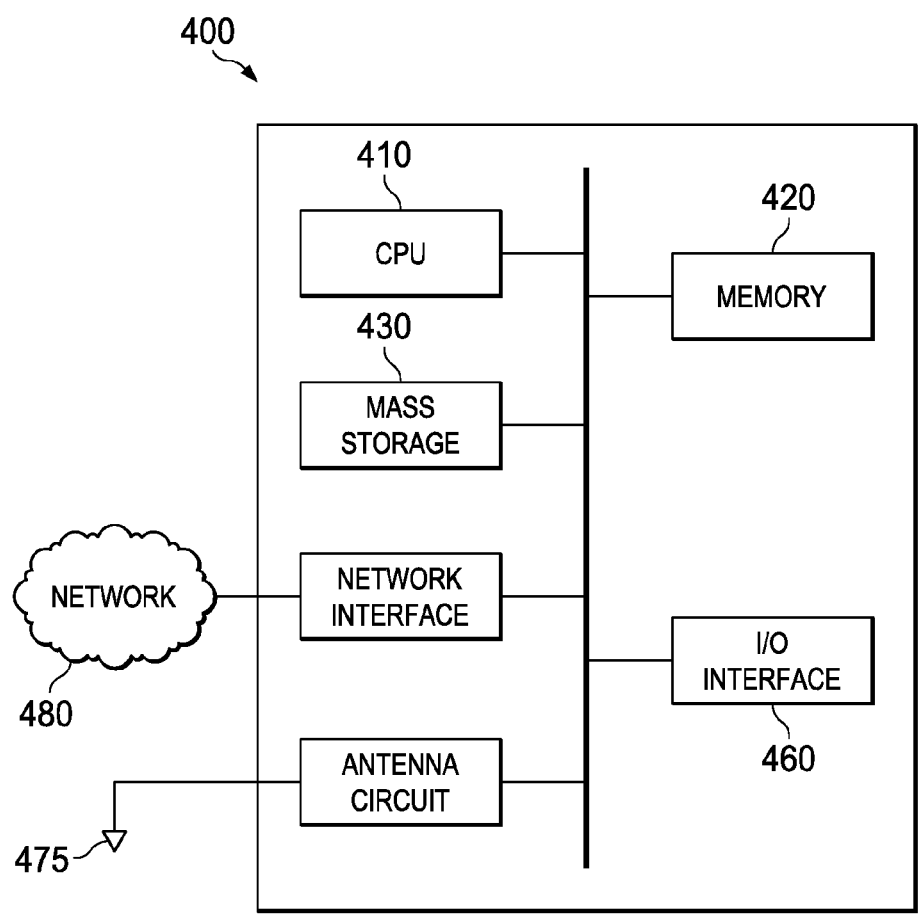
FIG. 4 illustrates a computing platform that may be used for implementing, for example, the devices and methods described herein, in accordance with an embodiment.

FIG. 4 is a block diagram of a processing system 400 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a speaker, microphone, mouse, touchscreen, keypad, keyboard, printer, display, and the like. The processing unit 401 may include a central processing unit (CPU) 410, memory 420, a mass storage device 430, a network interface 450, an I/O interface 460, and an antenna circuit 470 connected to a bus 440. The processing unit 401 also includes an antenna element 475 connected to the antenna circuit.

The bus 440 may be one or more of any type of several bus architectures including a memory bus or memory controller, a peripheral bus, video bus, or the like. The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs.

The mass storage device 430 may comprise any type of storage device configured to store data, programs, and other information and to make the data, programs, and other information accessible via the bus 440. The mass storage device 430 may comprise, for example, one or more of a solid state drive, hard disk drive, a magnetic disk drive, an optical disk drive, or the like.

The I/O interface 460 may provide interfaces to couple external input and output devices to the processing unit 401. The I/O interface 460 may include a video adapter. Examples of input and output devices may include a display coupled to the video adapter and a mouse/keyboard/printer coupled to the I/O interface. Other devices may be coupled to the processing unit 401 and additional or fewer interface cards may be utilized. For example, a serial interface such as Universal Serial Bus (USB) (not shown) may be used to provide an interface for a printer.

The antenna circuit 470 and antenna element 475 may allow the processing unit 401 to communicate with remote units via a network. In an embodiment, the antenna circuit 470 and antenna element 475 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 470 and antenna element 475 may also provide Bluetooth and/or WiFi connection to other devices.

The processing unit 401 may also include one or more network interfaces 450, which may comprise wired links, such as an Ethernet cable or the like, and/or wireless links to access nodes or different networks. The network interface 401 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a record-based multi-version concurrent control (MVCC) database (DB) management system for a snapshot consistent read, the method comprising:
   copying a system commit transaction identifier (TxID) and a current log record sequence number (LSN) from a transaction log at a start of a reader without backfilling of a commit LSN of a transaction to records that are changed and without copying an entire transaction table by the reader; and
   determining whether a record is visible according to a record TxID, the commit TxID and a current LSN, wherein a transaction table is consulted only when the record TxID is equal to or larger than a commit TxID at a transaction start.

2. The method of claim 1, wherein determining whether the record is visible comprises determining that the record is visible when a creation TxID of the record is less than the system commit TxID at the transaction start, or the transaction is the one itself that created the record.

3. The method of claim 1, wherein determining whether the record is visible comprises determining that the record is visible when a creation TxID of the record is committed and an end time stamp (ETS) of the creation TxID is less than the current LSN at the transaction start.

4. The method of claim 1, further comprising following a version store record ID (VSRID) to get a next record according to an update flag when a creation TxID is greater than or equal to the commit TxID at the transaction start, the transaction did not create the record, and the creation TxID is not committed or an end time stamp (ETS) of the creation TxID is greater than or equal to the current LSN at the transaction start.

5. The method of claim 1, further comprising determining that the record is not visible when a creation TxID is greater than or equal to the commit TxID at the transaction start and one of two conditions are met, wherein the conditions comprise determining that the creation TxID is not committed and that an end time stamp (ETS) of the creation TxID is greater than or equal to the current LSN at the transaction start.

6. The method of claim 1, further comprising determining that the record is deleted according to a deletion flag when a delete TxID is less than the commit TxID at the transaction start, or the transaction is the one itself that made the deletion.

7. The method of claim 1, further comprising determining that the record is deleted according to a deletion flag when a delete TxID is committed and an end time stamp (ETS) of the delete TxID is less than the current LSN at the transaction start.

8. A data processing system configured for managing a database, the data processing system comprising:
   a processor; and
   a computer readable storage medium storing programming for execution by the processor, the programming including instructions to:
   copy a system commit transaction identifier (TxID) and a current log record sequence number (LSN) from a transaction log at a start of a reader without backfilling of a commit LSN of a transaction to records that are changed and without copying an entire transaction table by the reader; and
   determine whether a record is visible according to a record TxID, the commit TxID and a current LSN, wherein a transaction table is consulted only when the record TxID is equal to or larger than a commit TxID at a transaction start.

9. The data processing system of claim 8, wherein the instructions to determine whether the record is visible comprise instructions to determine that the record is visible when a creation TxID of the record is less than the system commit TxID at the transaction start, or the transaction is the one itself that created the record.

10. The data processing system of claim 8, wherein the instructions to determine whether the record is visible comprise instructions to determine that the record is visible when a creation TxID of the record is committed and an end time stamp (ETS) of the creation TxID is less than the current LSN at the transaction start.

11. The data processing system of claim 8, wherein the programming further comprises instructions to follow a version store record ID (VSRID) to get a next record according to an update flag when the creation TxID is greater than or equal to the commit TxID at the transaction start and the creation TxID is not committed or an end time stamp (ETS) of the creation TxID is greater than or equal to the current LSN at the transaction start.

12. The data processing system of claim 8, wherein the programming further comprises instructions to determine that the record is not visible when the creation TxID is greater than or equal to the commit TxID at the transaction start and one of two conditions are met, wherein the conditions comprise determining that the creation TxID is not committed and that an end time stamp (ETS) of the creation TxID is greater than or equal to the current LSN at the transaction start.

13. The data processing system of claim 8, wherein the programming further comprises instructions to determine that the record is deleted according to a deletion flag when a delete TxID is less than the commit TxID at the transaction start, or the transaction is the one itself that deleted the record.

14. The data processing system of claim 8, wherein the programming further comprises instructions to determine that the record is deleted according to a deletion flag when a delete TxID is committed and an end time stamp (ETS) of the delete TxID is less than the current LSN at the transaction start.

15. A system for record-based multi-version concurrent control (MVCC) database (DB) management, the system comprising:
a transaction table comprising a status of each of a plurality of transactions in the system, wherein each transaction is indexed with a transaction identifier (TxID), wherein the TxIDs monotonically increase with time, and wherein a commit TxID is an oldest ID of active transactions in the transaction table;
a storage subsystem configured to store a plurality of versions of records and an update history for each record, wherein each record comprises a TxID of a transaction that created or deleted the record;
a logging subsystem comprising a processor, wherein the logging subsystem is configured to track all changes to the storage subsystem and configured to use a log record sequence number (LSN) for sequence comparison and recovery; and
a reader configured to copy only a system commit TxID and a current LSN and determine whether a record is visible according to a record TxID, commit TxID, and the current LSN at a transaction start without consulting the transaction table unless the record TxID is equal to or larger than the commit TxID at the transaction start.

16. The system of claim 15, wherein the reader is configured to determine that the record is visible when a creation TxID of the record is less than the system commit TxID at the transaction start, or the transaction is the one itself that created the record.

17. The system of claim 15, wherein the reader is configured to determine that the record is visible when a creation TxID of the record is committed and an end time stamp (ETS) of the creation TxID is less than the current LSN at the transaction start.

18. The system of claim 15, wherein the reader is configured to follow a version store record ID (VSRID) to get a next record according to an update flag when a creation TxID is greater than or equal to the commit TxID at the transaction start and the creation TxID is not committed or an end time stamp (ETS) of the creation TxID is greater than or equal to the current LSN at the transaction start.

19. The system of claim 15, wherein the reader is configured to determine that the record is not visible when a creation TxID is greater than or equal to the commit TxID at the transaction start and one of two conditions are met, wherein the conditions comprise determining that the creation TxID is not committed and that an end time stamp (EST) of the creation TxID is greater than or equal to the current LSN at the transaction start.

20. The system of claim 15, wherein the reader is configured to determine that the record is deleted according to a deletion flag when a delete TxID is less than the commit TxID at the transaction start, or the transaction is the one itself that deleted the record.

21. The system of claim 15, wherein the reader is configured to determine that the record is deleted according to a deletion flag when a delete TxID is committed and an end time stamp (ETS) of the delete TxID is less than the current LSN at the transaction start.

* * * * *